3,419,665
WATER-IN-OIL EMULSIONS CONTAINING MAGNESIUM SALTS OF A SUCCINIC ACID ESTER
Felix Lachampt, Franconville, Andre Viout, Paris, and Guy Vanlerberghe, Mitry-Mory, France, assignors to L'Oreal, Paris, France a corporation of France
No Drawing. Filed Sept. 29, 1965, Ser. No. 491,439
Claims priority, application France, Oct. 5, 1964, 990,354
6 Claims. (Cl. 424—365)

It is well known that many cosmetics are made from water-in-oil emulsions. However, such emulsions, which must be stable, irreversible, and preferably fluid, are very difficult to prepare in the present state of the art.

In fact most of the emulsions now known permit some of the oil to escape within a relatively short time. Moreover, it frequently happens that an emulsion which is initially of the water-in-oil type is spontaneously transformed into the oil-in-water type when an excess of water is added.

The present invention is based on the discovery of emulsifiers which make it possible to prepare stable irreversible emulsions of the water-in-oil type. These emulsions are very fluid most of the time.

Moreover, the emulsions obtained in accordance with the invention are especially valuable when used in the cosmetic field, since they are very effective in moisturizing the lipidoproteidic complex which constitutes the outer layer of the skin and thus preventing dryness thereof.

This remarkable property of cosmetic emulsions of this invention appears to result not only from the particles of water which are retained by the continuous oily phase, but also from the fact that the products making up the emulsions according to the invention contains a considerable amount of combined water.

This particularly advantageous characteristic of emulsions of this invention is evidenced by the fact that, when spread out in a thin layer, they dry up very slowly, even when placed in a relatively dry atmosphere.

Moreover, the emulsions of this invention have the important advantage of facilitating the penetration of the products forming the emulsion into the skin.

One object of the present invention is to provide a new article of manufacture consisting of an emulsifier which makes it possible to prepare emulsions of the water-in-oil type, characterized by the fact said emulsifier comprises at least one magnesium salt of a succinic ester of a polyoxyalkylene fatty alcohol having the formula:

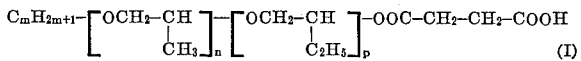

(I)

in which:

$m$ is an integer lying between 12 and 18 inclusive, $n$ and $p$ are numbers lying between 0 and 12 inclusive, while the sum of $n$ and $p$ falls between 2 and 12 inclusive.

Another object of the present invention is to provide a new article of manufacture which consists of a water-in-oil emulsion characterized by the fact that it contains at least one of the emulsifiers hereinbefore described.

A further object of the invention is to provide a new article of manufacture which consists of a cosmetic or a pharmaceutical excipient characterized by the fact that it is in the form of a water-in-oil emulsion and contains one of the emulsifiers hereinbefore described.

The proportion of water in the emulsions of this invention may vary within broad limits, for example, from 20% to 60%, while the proportion of emulsifier may vary from about 10% to about 30% of the total ingredients and run to about 20% of the amount of oil.

The oil in the emulsion may comprise any of a large number of products such as:

Hydrocarbon oils, such as paraffin oil, petrolatum, perhydrosqualene, and solutions of microcrystalline wax in paraffin oil;

Animal or vegetable oils, such as horse oil, lard, sweet almond oil, and calophyllum oil, these oils being readily absorbed by the skin, but becoming rancid under certain circumstances;

Saturated esters which are incapable of becoming rancid and are good penetrants, such as isopropyl palmitate, isopropyl myristate, ethyl palmitate, etc.; and Silicone oils which are soluble in other oils.

Suitable additives include: long chain fatty alcohols such as cetyl alcohol, stearyl alcohol, fatty alcohol from beeswax, cholesterol, lanolin alcohol, and magnesium stearate.

Principally in the case in which the emulsions are intended for use in cosmetic or pharmaceutical products, it is preferable that the water be free of electrolytes and products in solution.

The emulsions according to the invention make it possible to produce a large variety of cosmetics, such as moisturizing creams, foundation creams, liquid or cream make-up, brilliantine, etc.

They also make it possible to produce excellent medical excipients having great penetrating power.

In order to prepare the magnesium salts of the succinic monoesters defined in Formula I the following procedure may be followed:

Fatty alcohols having 12 to 18 carbon atoms are reacted with propylene oxide or butylene oxide or a mixture thereof in the presence of an alkaline catalyst (sodium or sodium methylate, for example, in the ratio of about 0.1 to 0.5% of sodium in proportion to the fatty alcohol).

The reaction is preferably carried out in an autoclave under pressure, at a temperature between 100 and 150° C.

The resulting product is then washed with an aqueous solution containing 10 to 20% methanol.

The polyoxyalkylene fatty alcohols are then esterified with succinic anhydride in the presence of pyridine at a temperature of about 90 to 100° C.

The esterification takes about 3 hours.

The proportions in the starting composition are:

1 mol of polyoxyalkylene alcohol
1.10 mols of succinic anhydride
2 mols of pyridine A practically complete esterification is obtained.

In order to prepare the magnesium salt of the ester produced in this manner, the succinic monoester in question is neutralized by a stoichiometric quantity of KOH or NaOH at 40% in the presence of enough water to produce an isotropic solution at a concentration of N/3 at the end of the process.

This neutralization is carried out while the composition is being vigorously agitated at a temperature of about 80° C.

The magnesium salt is precipitated at once, using an excess of magnesium chloride in solution. Two successive washings will then suffice to obtain the desired magnesium salt.

In order to prepare an emulsion according to the invention, the hydrated magnesium salt which has been obtained in the manner just described, is dissolved in the oil of the emulsion at a temperature of 80° C.

The mixture is then vigorously agitated while the desired quantity of water, which has preferably also been brought to a temperature of about 80° C., is poured in. The mixture is then cooled, while agitation is continued.

3

The viscosity of the resulting emulsions naturally depends on their composition, but it is possible to obtain very fluid emulsions because of the solubility of the emulsifiers in many oils.

In order that the invention may be clearly understood, several exemplary methods of carrying it out will now be described, purely by way of illustration. The compositions described in these examples are in each case obtained by preparing the emulsion in the manner hereinbefore described.

EXAMPLE 1

A moisturizing lotion may be prepared in accordance with the invention, having the following composition—

Magnesium salt of a composition having the following formula:

$$C_{18}H_{37}\text{---}\left[OCH_2\text{---}CH\atop\ \ \ \ \ \ \ \ \ \ CH_3\right]_{5,6}\text{---}O\text{---}\underset{\underset{O}{\|}}{C}\text{---}CH_2CH_2\text{---}COOH$$

|  | G. |
|---|---|
| (above compound) | 25 |
| Paraffin oil | 25 |
| Perfume | 0.2 |
| Water | 49.8 |

EXAMPLE 2

A moisturizing cream may be prepared having the following composition—

Magnesium salt of a composition having the following formula:

$$C_{12}H_{25}\text{---}\left[OCH_2\text{---}CH\atop\ \ \ \ \ \ \ \ \ \ CH_3\right]_{2}\text{---}O\text{---}\underset{\underset{O}{\|}}{C}\text{---}CH_2CH_2\text{---}COOH$$

|  | G. |
|---|---|
| (above compound) | 15 |
| Paraffin oil | 25 |
| Total fatty alcohols from beeswax | 8 |
| Microcrystalline wax | 5 |
| Perfume | 0.2 |
| Water | 46.8 |

EXAMPLE 3

A foundation cream having the following composition may be prepared—

Magnesium salt of a composition having the following formula:

$$C_{18}H_{37}\text{---}\left[OCH_2\text{---}CH\atop\ \ \ \ \ \ \ \ \ \ CH_3\right]_{4}\text{---}O\text{---}\underset{\underset{O}{\|}}{C}\text{---}CH_2CH_2\text{---}COOH$$

|  | G. |
|---|---|
| (above compound) | 13 |
| Paraffin oil | 10 |
| Isopropyl myristate | 10 |
| Microcrystalline wax | 2 |
| Titanium oxide | 2 |
| Ochers | 1.5 |
| Perfume | 0.25 |
| Water | 61.25 |

EXAMPLE 4

A hand cream may be prepared having the following composition—

Magnesium salt of a composition having the formula:

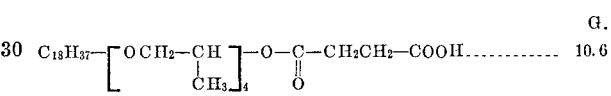

in which $n$ is an integer adjacent to $p$ and $n+p=3$

|  | G. |
|---|---|
| (above compound) | 25 |
| Cetyl alcohol | 3 |
| Isopropyl palmitate | 8 |
| Petrolatum | 11 |
| Microcrystalline wax | 0.5 |
| Titanium oxide | 5 |
| Perfume | 0.2 |
| Water | 47.3 |

4

EXAMPLE 5

A make-up for the cheeks may be prepared having the following compositions—

Magnesium salt of a composition having the following formula:

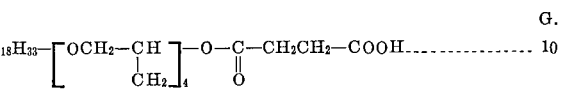

10

Magnesium salt of a composition having the following formula:

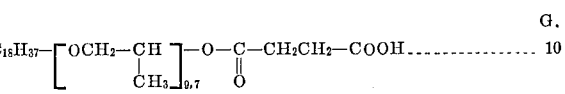

10

| Isopropyl myristate | 8 |
|---|---|
| Petrolatum | 12 |
| Microcrystalline wax | 4 |
| Pigments | 2 |
| Perfume | 0.2 |
| Water | 53.8 |

EXAMPLE 6

A brilliantine for men having the following composition may be prepared—

Magnesium salt of a composition having the following formula:

$$C_{18}H_{37}\text{---}\left[OCH_2\text{---}CH\atop\ \ \ \ \ \ \ \ \ \ CH_3\right]_{4}\text{---}O\text{---}\underset{\underset{O}{\|}}{C}\text{---}CH_2CH_2\text{---}COOH$$

|  | G. |
|---|---|
| (above compound) | 10.6 |
| Paraffin oil | 18 |
| Lanolin | 3.3 |
| Microcrystalline wax | 2 |
| Perfume | 0.2 |
| Water | 65.9 |

This cream leaves no whitish residue after application and keeps the hair in place while imparting a sheen to it.

EXAMPLE 7

A cream for treating burns may be prepared, having a composition which will be given below. This example is given only to show that the emulsions according to the invention are suitable for use as pharmaceutical excipients. It is not an object of the invention to provide a product which is new from the pharmaceutical point of view, since the use of calophyllum oil in treating burns is well known.

Magnesium salt having the following formula:

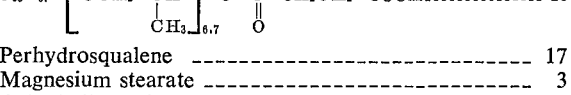

| Perhydrosqualene | 17 |
|---|---|
| Magnesium stearate | 3 |
| Calophyllum oil | 2 |
| Water | 58 |

EXAMPLE 8

A cuticle cream having the following composition may be prepared—

Magnesium salt of a composition having the formula:

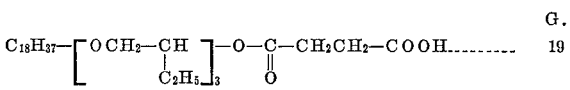

| Paraffin oil | 18 |
|---|---|
| Sweet almond oil | 2 |
| Magnesium stearate | 10 |
| Perfume | 0.2 |
| Water | 50.8 |

The emulsions described in the foregoing examples are of the water-in-oil type, are quite stable, and do not tend to change to emulsions of the oil-in-water type when an excess of water is added.

All these emulsions make it possible to moisturize the outer layer of the skin most efficaceously.

The emulsions of this invention are particularly useful in preparing foundation creams, make-up or hand creams. The make-up creams are especially resistant to the action of water and may be removed only by cleansing creams or lotions.

Titanium oxide and pigments, when well dispersed in these emulsions, penetrate remarkably and cover the skin without giving a caked effect. The unusually large quantity of titanium oxide included in the hand cream of Example 4 should be noted in this respect.

Finally the fact that the emulsifiers of this invention are completely harmless and very penetrating make them excellent medical excipients.

It will be appreciated that the methods of carrying out the invention which have been described have been given purely by way of example and may be modified as to detail without thereby departing from the basic principles of the invention.

In particular, several emulsions of this invention may be used simultaneously.

It is also obvious that any conventional ingredients may be introduced into the emulsions of this invention, particularly those which serve to increase the stability and length of time the emulsions will keep.

Finally the emulsions of this invention may be used for applications outside the fields of cosmetics and pharmaceutical excipients.

What is claimed is:

1. A water-in-oil emulsion comprising water, at least 20% oil and an emulsifying amount of at least one magnesium salt of a succinic acid ester of a polyoxyalkylene fatty alcohol having the formula:

in which $m$ is an integer between 12 and 18 and $n$ and $p$ are numbers between 0 and 12 inclusive and the sum of $n$ and $p$ is between 2 and 12 inclusive.

2. The water-in-oil emulsion of claim 1, wherein the amount of said water present in said emulsion is 20 to 60% of said emulsion.

3. The water-in-oil emulsion of claim 1, wherein the amount of said emulsifier present in said emulsion is 10 to 30% of said emulsion.

4. The water-in-oil emulsion of claim 1, wherein said oil in said emulsion is a hydrocarbon oil.

5. The water-in-oil emulsion of claim 1, wherein said oil in said emulsion is an animal oil.

6. The water-in-oil emulsion of claim 1, wherein said oil is a vegetable oil.

References Cited

UNITED STATES PATENTS 3,016,353   1/1962   Matuszak _____ 260—485
3,285,945   11/1966  Wember.

ALBERT T. MEYERS, *Primary Examiner.*

D. R. MAHANAND, *Assistant Examiner.*

U.S. Cl. X.R.

424—63, 61, 70; 260—485; 252—356